(12) United States Patent
Sundaram et al.

(10) Patent No.: US 11,204,718 B2
(45) Date of Patent: Dec. 21, 2021

(54) APPARATUSES, SYSTEMS, AND METHODS TO STORE PRE-READ DATA ASSOCIATED WITH A MODIFY-WRITE OPERATION

(71) Applicant: Intel Corporation, Santa Clara, CA (US)

(72) Inventors: Rajesh Sundaram, Folsom, CA (US); Zion S. Kwok, Vancouver (CA); Muthukumar Swaminathan, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/586,428

(22) Filed: Sep. 27, 2019

(65) Prior Publication Data
US 2020/0019348 A1   Jan. 16, 2020

(51) Int. Cl.
*G06F 3/06* (2006.01)
(52) U.S. Cl.
CPC .......... *G06F 3/0659* (2013.01); *G06F 3/0611* (2013.01); *G06F 3/0644* (2013.01); *G06F 3/0673* (2013.01)
(58) Field of Classification Search
CPC .... G06F 3/0659; G06F 3/0673; G06F 3/0644; G06F 2212/1056; G06F 2122/6022; G06F 12/0862
See application file for complete search history.

(56) References Cited

U.S. PATENT DOCUMENTS 9,830,108 B2 * 11/2017 Hsu .................. G06F 3/065
10,025,532 B2 * 7/2018 Manohar ........... G06F 3/0679
2017/0352434 A1 * 12/2017 Ryu .................. G11C 29/54

* cited by examiner

*Primary Examiner* — Michelle T Bechtold
(74) *Attorney, Agent, or Firm* — Schwabe, Williamson & Wyatt, P.C.

(57) ABSTRACT

Embodiments are directed towards apparatuses, methods, and systems including a pre-read command to eliminate an additional access of read data from a storage location of a memory device. In embodiments, a memory controller issues a pre-read command to store read data in a pre-read latch. In embodiments, the command is issued during a first access of the read data from a storage location in connection with a modify-write operation of the read data. In embodiments, the pre-read latch is located in or coupled to a selected partition of a memory device that includes the storage location that stores the read data. In embodiments, the memory controller subsequently issues a modify-write command to compare the read data stored in the pre-read latch with incoming data, to eliminate a need for a second access of the storage location during completion of the modify-write operation. Additional embodiments may be described and claimed.

14 Claims, 9 Drawing Sheets

APPARATUSES, SYSTEMS, AND METHODS TO STORE PRE-READ DATA ASSOCIATED WITH A MODIFY-WRITE OPERATION

FIELD

Embodiments of the present disclosure generally relate to the field of integrated circuits (IC), and more particularly, to write operation techniques related to memory devices.

BACKGROUND

Modify-write operations to memory often involve redundant operations. For example, generic read and write commands are typically used in connection with writes performed on server memory. The server use write typically always involves both a read and a write operation. These operations are redundant and require additional energy, thus limiting the performance of the computing and memory devices.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
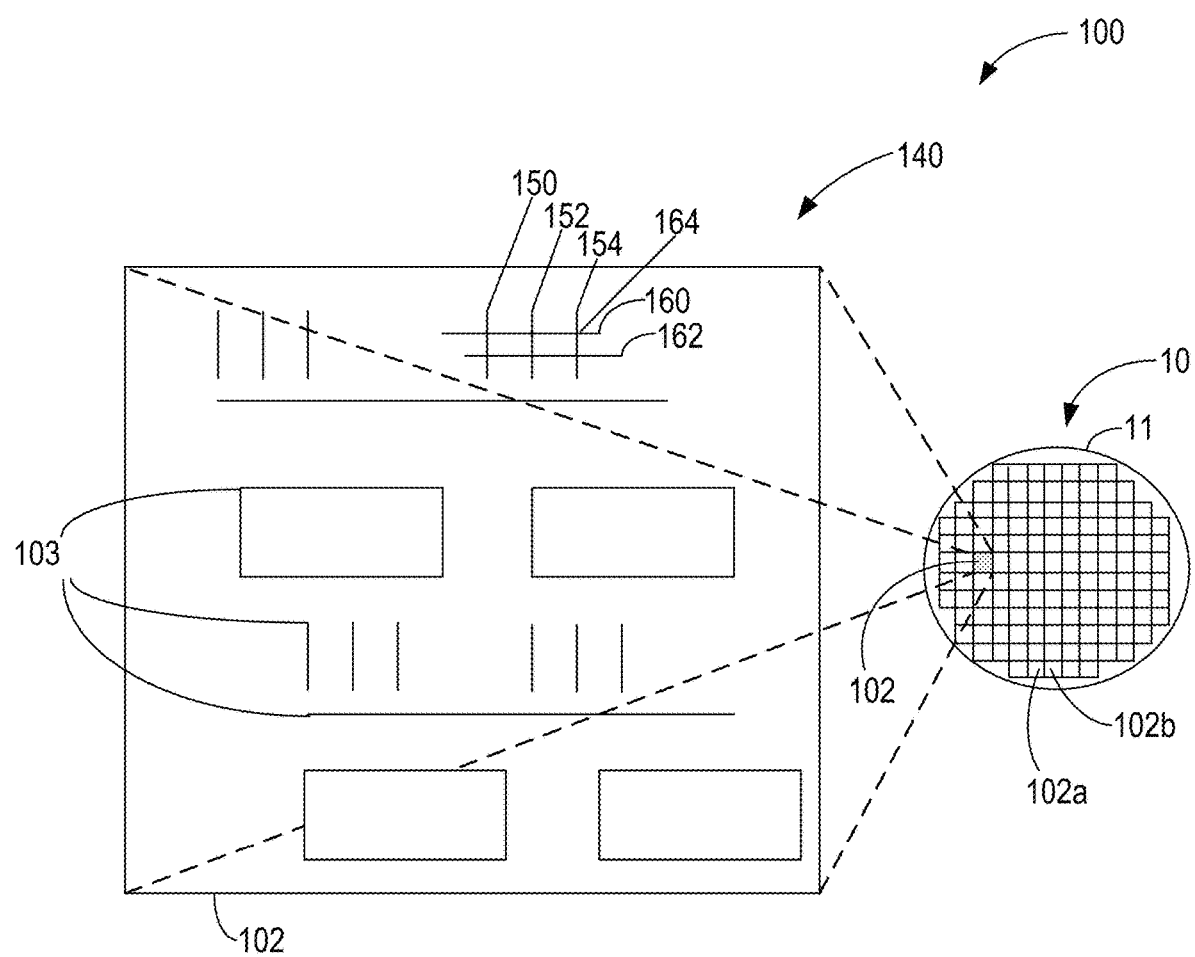
FIG. 1 illustrates an example die that may include storage locations of a memory device, in accordance with embodiments of the present disclosure.

Embodiments described include methods, apparatuses, and systems to simplify a modify-write operation associated with a memory device. In embodiments, a pre-read command assists in reducing or eliminating a need for an additional or second access of read data from a storage location of the memory device. In embodiments, a memory controller issues the pre-read command to the memory device to store read data in a storage element, such as a pre-read latch, wherein the command is issued during a first access of the read data from a storage location in the memory device in connection with a modify-write operation of the read data. In embodiments, the pre-read latch is located in or coupled to a selected partition of a memory device that includes the storage location that stores the read data. In embodiments, the memory controller subsequently issues a modify-write command to compare the read data stored in the pre-read latch with incoming data, to eliminate a need for a second access of the read data from the storage location during completion of the modify-write operation of the read data.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

FIG. 1 illustrates an example die that may include storage locations located in a memory device in connection with techniques of the present disclosure, in accordance with some embodiments. More specifically, FIG. 1 schematically illustrates an integrated circuit assembly (IC) assembly 100 including a top view of die 102 in wafer form 10 and in singulated form 140, in accordance with some embodiments. In some embodiments, the die 102 may be one of a plurality of dies (e.g., die 102, 102a, 102b) of a wafer 11 composed of semiconductor material such as, for example, silicon or other suitable material. The plurality of dies may be formed on a surface of the wafer 11. Each of the dies may be a repeating unit of a semiconductor product that may form a memory device. For example, die 102 may include circuitry 103 and/or another memory device module or component as described herein in accordance with some embodiments. According to various embodiments, the circuitry 103 may include one or more memory elements (memory cells, such as, e.g., multi-level per cell (MLC) memory cells), that may serve as storage locations, which may be configured in an array, such as a two-dimensional (2D) or three-dimensional (3D) non-volatile MLC memory array. In some embodiments, the memory array comprises a cross-point memory array. In embodiments, the memory elements, e.g., memory cells, are divided into partitions or a plurality of partitions, and may store data in response to a modify-write operation, as described in connection with FIGS. 3-8.

The circuitry 103 may further include one or more wordline(s) (also referred to as "WL" or "WLs") (e.g., 150, 152, 154) and one or more bitline(s) (also referred to as "BL" or "BLs") (e.g., 160, 162) coupled to the memory elements. Only three wordlines and two bitlines are shown in FIG. 1 for ease of understanding. In some embodiments, the bitlines and wordlines may be configured such that each of the memory elements may be disposed at an intersection (e.g., 164) of each individual bitline and wordline (e.g., 160 and 154), in a cross-point configuration. A voltage or bias can be applied to a target memory element of the memory elements using the wordlines and the bitlines to select the target memory cell for a read or write operation. Bitline drivers may be coupled to the bitlines and wordline drivers may be coupled to the wordlines to facilitate decoding/selection of the memory elements. To enable memory cell selection, the wordlines 150, 152, 154 may be connected with memory cells and other parts of circuitry 103 via interconnects, including respective contact structures (e.g., vias) that provide electrical connectivity through the layers of the die 102 as described below in greater detail. It is noted that the circuitry 103 is only schematically depicted in FIG. 1 and may represent a wide variety of suitable logic or memory in the form of circuitry or other suitable devices and configurations including, for example, one or more state machines including circuitry and/or instructions in storage (e.g., firmware or software) configured to perform actions such as storing pre-read data in connection with a modify-write operation, as described herein. Note that sequencer 305, as discussed below in connection with FIG. 3, may control one or more of such example state machines.

In some embodiments, circuitry 103 may be formed using suitable semiconductor fabrication techniques, some of which are described herein. After a fabrication process of the semiconductor product is complete, the wafer 11 may undergo a singulation process in which each of the dies (e.g., die 102) may be separated from one another to provide discrete "chips" of the semiconductor product. The wafer 11 may be any of a variety of sizes. According to various embodiments, the circuitry 103 may be disposed on a semiconductor substrate in wafer form 10 or singulated form 140. In some embodiments, the die 102 may include storage locations of a cache device or a primary storage device, in accordance with embodiments described further below.

Figure 2:
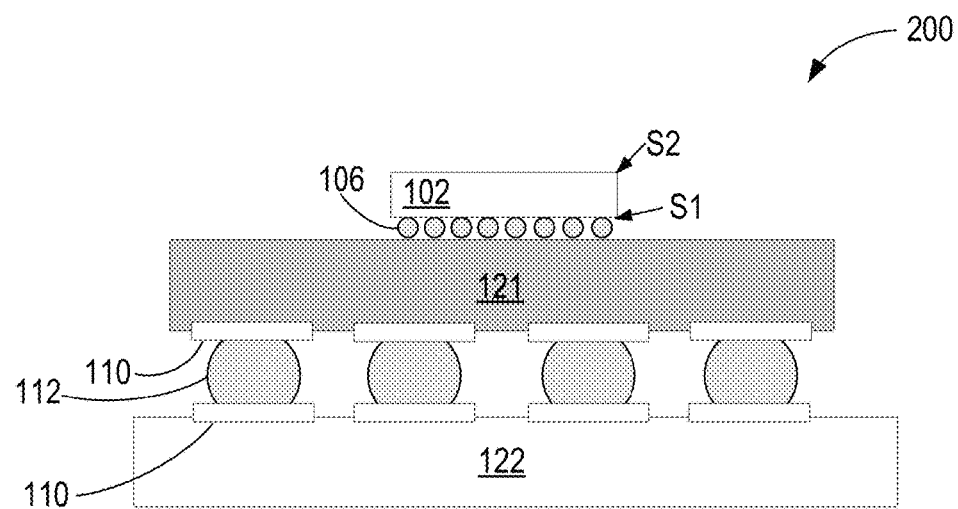
FIG. 2 schematically illustrates a cross-section side view of an integrated circuit (IC) assembly that may be included in the memory device of FIG. 1, in accordance with embodiments of the present disclosure.

FIG. 2 schematically illustrates a cross-section side view of an example integrated circuit (IC) assembly 200 that may be included in a memory device, provided in accordance with some embodiments described herein. In some embodiments, the IC assembly 200 may include one or more dies electrically and/or physically coupled with a package substrate 121. The die 102 may include circuitry (e.g., circuitry 103 of FIG. 1) and/or other suitable components or modules to perform operations in connection with simplifying a modify-write operation as described herein. In some embodiments, the package substrate 121 is coupled with a circuit board 122, as shown.

The IC assembly 200 may include a wide variety of configurations including, for example, suitable combinations of flip-chip and/or wire-bonding configurations, interposers, multi-chip package configurations including System in Package (SiP) and/or Package on Package (PoP) configurations. For example, the die 102 can be attached to the package substrate 121 according to a wide variety of suitable configurations including, for example, being directly coupled with the package substrate 121 in a flip-chip configuration, as depicted. In the flip-chip configuration, an active side, S1, of the die 102 including active circuitry is attached to a surface of the package substrate 121 using die-level interconnect structures 106 such as bumps, pillars, or other suitable structures that may also electrically couple the die 102 with the package substrate 121. The active side S1 of the die 102 may include circuitry such as, for example, memory elements as described in reference to FIG. 1. An inactive side, S2, may be disposed opposite to the active side S1, as can be seen. In other embodiments, the die 102 may be disposed on another die that is coupled with the package substrate 121 in any of a variety of suitable stacked die configurations. For example, a processor die may be coupled with the package substrate 121 in a flip-chip configuration and the die 102 may be mounted on the processor die in a flip-chip configuration and electrically coupled with the package substrate 121 using through-silicon vias (TSVs) formed through the processor die. In still other embodiments, the die 102 may be embedded in the package substrate 121 or coupled with a die that is embedded in the package substrate 121. Other dies may be coupled with the package substrate 121 in a side-by-side configuration with the die 102 in other embodiments.

In some embodiments, the die-level interconnect structures 106 may be configured to route electrical signals between the die 102 and the package substrate 121. The electrical signals may include, for example, input/output (I/O) signals and/or power/ground signals that are used in connection with operation of the die. The die-level interconnect structures 106 may be coupled with corresponding die contacts disposed on the active side S1 of the die 102 and corresponding package contacts disposed on the package substrate 121. The die contacts and/or package contacts may include, for example, pads, vias, trenches, traces and/or other suitable contact structures, fabrication of some of which is described below.

In some embodiments, the package substrate 121 may comprise an epoxy-based laminate substrate having a core and/or build-up layers such as, for example, an Ajinomoto Build-up Film (ABF) substrate. The package substrate 121 may include other suitable types of substrates in other embodiments including, for example, substrates formed from glass, ceramic, or semiconductor materials.

The package substrate 121 may include electrical routing features configured to route electrical signals to or from the die 102. The electrical routing features may include, for example, package contacts (e.g., pads 110) disposed on one or more surfaces of the package substrate 121 and/or internal routing features (not shown) such as, for example, trenches, vias, or other interconnect structures to route electrical signals through the package substrate 121.

In some embodiments, the package substrate 121 may be coupled with a circuit board 122, as can be seen. The circuit board 122 may be a printed circuit board (PCB) composed of an electrically insulative material such as an epoxy laminate. For example, the circuit board 122 may include electrically insulating layers composed of materials that may be laminated together. Interconnect structures (not shown) such as traces, trenches, or vias may be formed through the electrically insulating layers to route the electrical signals of the die 102 through the circuit board 122. The circuit board 122 may be composed of other suitable materials in other embodiments. In some embodiments, the circuit board 122 may be a motherboard and may be included in a computing device, such as, for example, a mobile device. Package-level interconnects such as, for example, solder balls 112 may be coupled to pads 110 on the package substrate 121 and/or on the circuit board 122 to form corresponding solder joints that may be configured to further route the electrical signals between the package substrate 121 and the circuit board 122. The pads 110 may be composed of any suitable electrically conductive material such as metal. The package-level interconnect may include other structures and/or configurations including, for example, land-grid array (LGA) structures and the like. In embodiments, the die 102 of the IC assembly 200 may be, include, or be a part of an IC included in a memory device, such as, e.g., a memory device that includes a storage element, e.g., one or more of a read latch or a pre-read latch associated with a partition of a memory device to assist in simplifying a modify-write operation as described in connection with FIGS. 3-8 described below.

Figure 3:
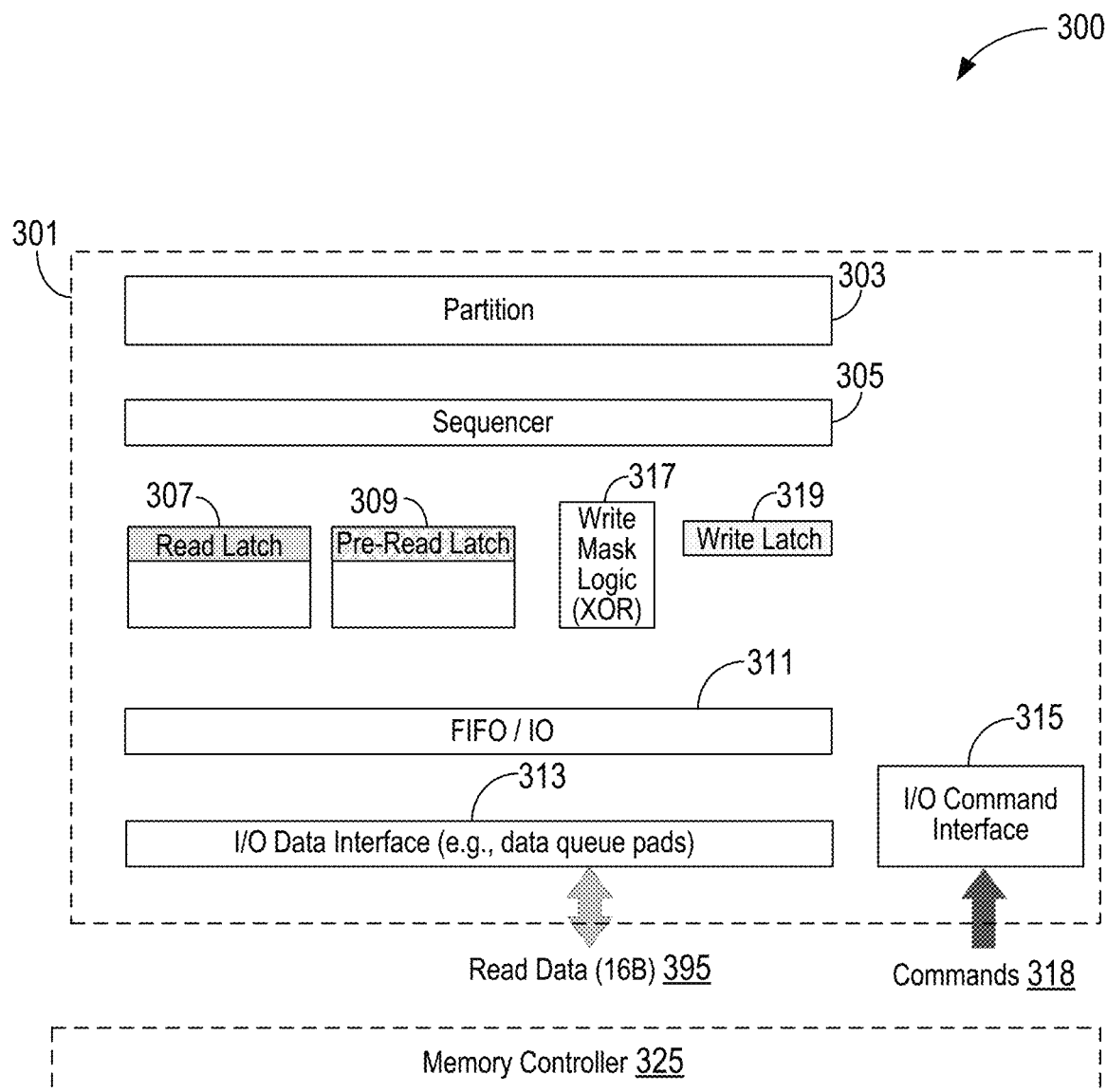
FIG. 3 is an example block diagram illustrating an overview of a memory device including a storage element to simplify modify-write operations in the memory device, according to embodiments of the present disclosure.

FIG. 3 is an example block diagram 300 illustrating an overview of a memory device (or portion of a memory device 301) including a storage element in connection with modify-write operations in memory device 301, according to embodiments. In embodiments, the storage element includes a pre-read latch to assist with eliminating a need for an additional or second access of read data from the storage location. In embodiments, memory device 301 includes a partition 303 of a plurality of partitions of memory cells in the memory device coupled to an internal state machine controller such as, e.g., sequencer 305. In embodiments, sequencer 305 includes circuitry and/or firmware to control voltages and currents to assist in performing reads and writes to/from memory cells in partition 303. In embodiments, sequencer 305 is coupled to a read data storage element and a pre-read data storage element, such as respective read latch 307 and pre-read latch 309. In some embodiments, read latch 307 and pre-read latch 309 include one or more circuits to store state information.

As shown, in embodiments, read latch 307 and pre-read latch 309 are in turn coupled to an I/O cache or I/O buffer 311 and associated logic to implement a queue via, e.g., first-in-first-out (FIFO) algorithm or logic, which is in turn coupled to I/O data interface ("data interface 313"), e.g., data queue pads, to assist in receiving and sending read data 395. In embodiments, command interface pads or command interface 315 couples memory device 301 to receive commands 318 from, e.g., memory controller 325. In embodiments, data interface 313 and command interface 315 include an interface, e.g., a combination of software and/or hardware, e.g., pins, ports, wires, and the like, to transmit and receive signals to/from memory controller 325. In the embodiment, as shown, memory device 301 also includes write mask logic 317, and a write data storage element, e.g., write latch 319, coupled between sequencer 305 and I/O buffer 311. It is to be understood that block diagram 300 has been simplified in order to avoid obscuring the embodiments, accordingly, various elements of memory device 301 have been omitted. For example, although only one partition 303 is shown, it is to be understood that partition 303 is only one of a plurality of partitions of memory device 301.

Figure 4A:
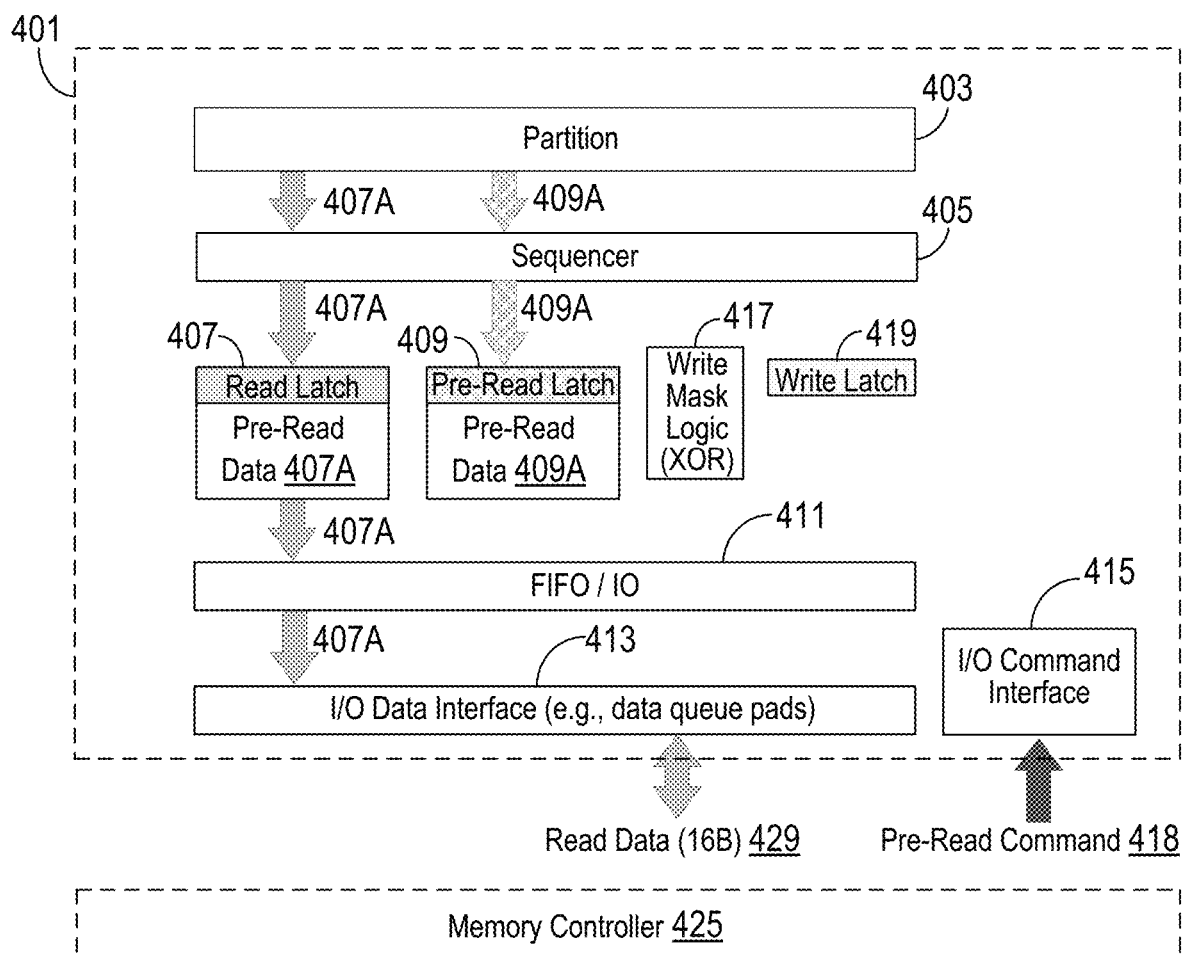
FIGS. 4A and 4B are example block diagrams illustrating operations to simplify modify-write operations in connection with the memory device of FIG. 3, in accordance with embodiments of the present disclosure.
Figure 4B:
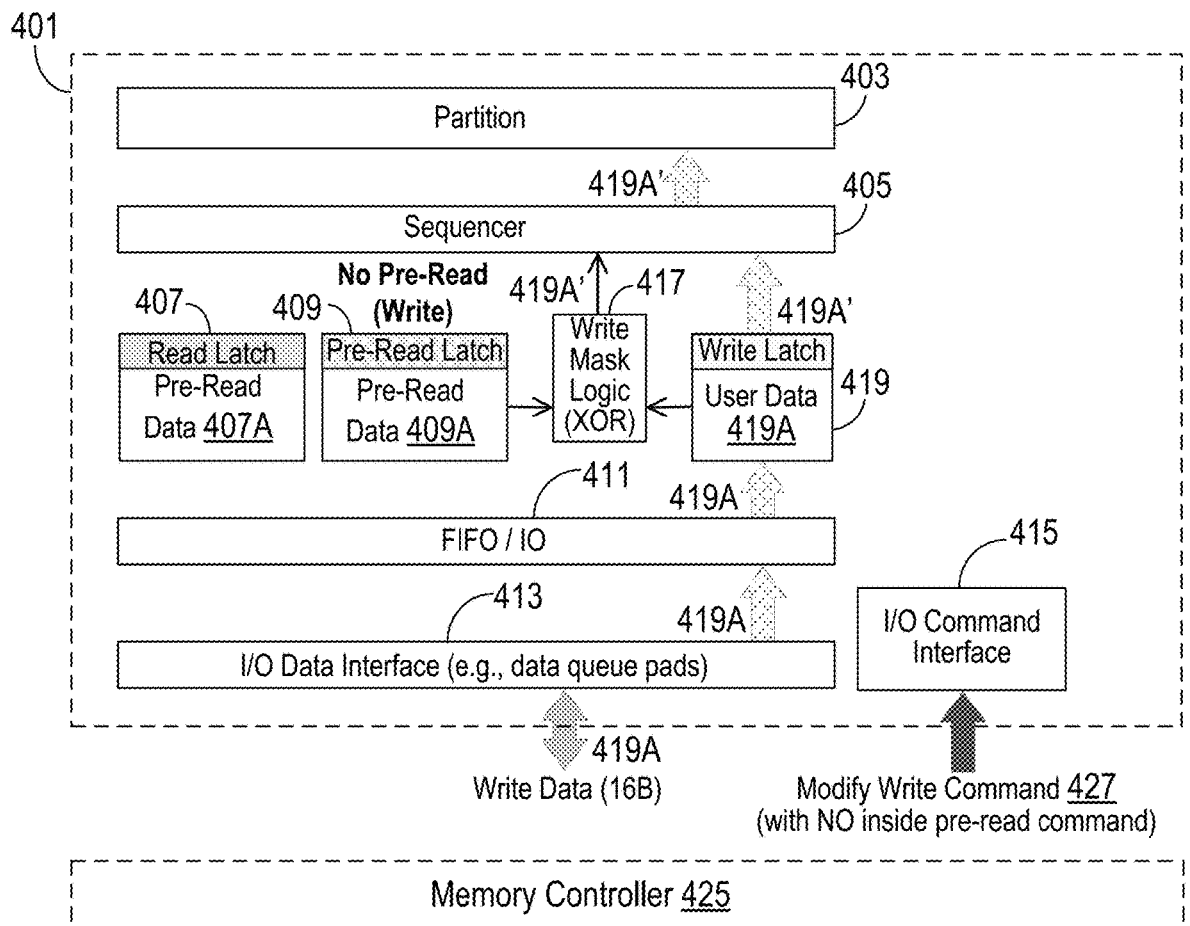

Next, FIGS. 4A and 4B illustrate operations to simplify modify-write operations performed in a memory device 401 (similar to, or the same as, memory device 301 of FIG. 3), in accordance with embodiments. Note that similar elements may be shown in FIGS. 4A, 4B, and the below FIGS. 6-8 but in order to avoid obscuring the embodiments, in various cases may not be reintroduced. Accordingly, in embodiments, in FIG. 4A, a memory controller 425 issues a pre-read command 418 to be received by command interface 415 of memory device 401. In embodiments, pre-read command 418 instructs memory device 401 to retrieve and store pre-read data 409A in a pre-read latch 409. Accordingly, a partition 403 includes a storage location and provides, via sequencer 405, access to pre-read data 409A from the storage location. In embodiments, pre-read latch 409 stores pre-read data 409A to be used for a later pre-read operation. Note that pre-read data 409A include similar or the same data as read data (and the same as, e.g., pre-read data 407A, as discussed further below) to be modified. In embodiments, storage of pre-read data 409A in pre-read latch 409 eliminates an additional or second access of the read data from the storage location that may typically be performed during a write portion (as described in connection with FIG. 4B below) of the modify-write operation. In embodiments, the storage location includes one or more memory cells of the selected partition to store the read data.

Note that pre-read command 418 is issued during a first access of the read data from a storage location in the memory device in connection with the modify-write operation of read data. In embodiments, memory controller 425 issues pre-read command 418 at a similar time it issues a read command (e.g., at 429) to retrieve and transport read data in connection with the pre-read command, e.g., pre-read data 407A, to memory controller 425 for modification. Accordingly, memory device 401 stores pre-read data 407A in read latch 407, during a first access of read data. In embodiments, read latch 407 is coupled to provide pre-read data 407A to FIFO logic or I/O buffer 311, to I/O data interface 313, and subsequently memory controller 425. In embodiments, memory controller 425 receives and modifies pre-read data 407A into new write data. In embodiments, the new write data includes the pre-read data 407A that is modified by new user data as well as error correction code (ECC) information. Note that pre-read data 407A, stored in read latch 407, is subject to be rewritten by read data or pre-read data based on commands going through read latch 407, unlike pre-read data 409A stored in the new pre-read latch 409.

Accordingly, in FIG. 4B, memory controller 425 issues a modify-write command 427 (via command interface 415) to memory device 401 to compare pre-read data 409A stored in pre-read latch 409 with incoming data or user data. In embodiments, a modify-write command 427 assists in eliminating a need for a second access of the read data from the storage location during completion of the modify-write operation of the read data. In embodiments, to compare the read data stored in the pre-read latch 409 with incoming data in write latch 419 comprises to perform, by write mask logic 417, a mask operation including, e.g., an exclusive (XOR) operation by XOR logic gates. In embodiments, memory device 401 then (via, e.g., sequencer 405) writes into the storage location of partition 403 bits that have changed. Note that in the FIG., 419A' denotes bits to be written to memory device 401 and/or information related to bits to be written to memory device 401. Accordingly, in embodiments, modify-write command 427 does not include an inside pre-read command as would be required in a typical modify-write command.

Figure 5:
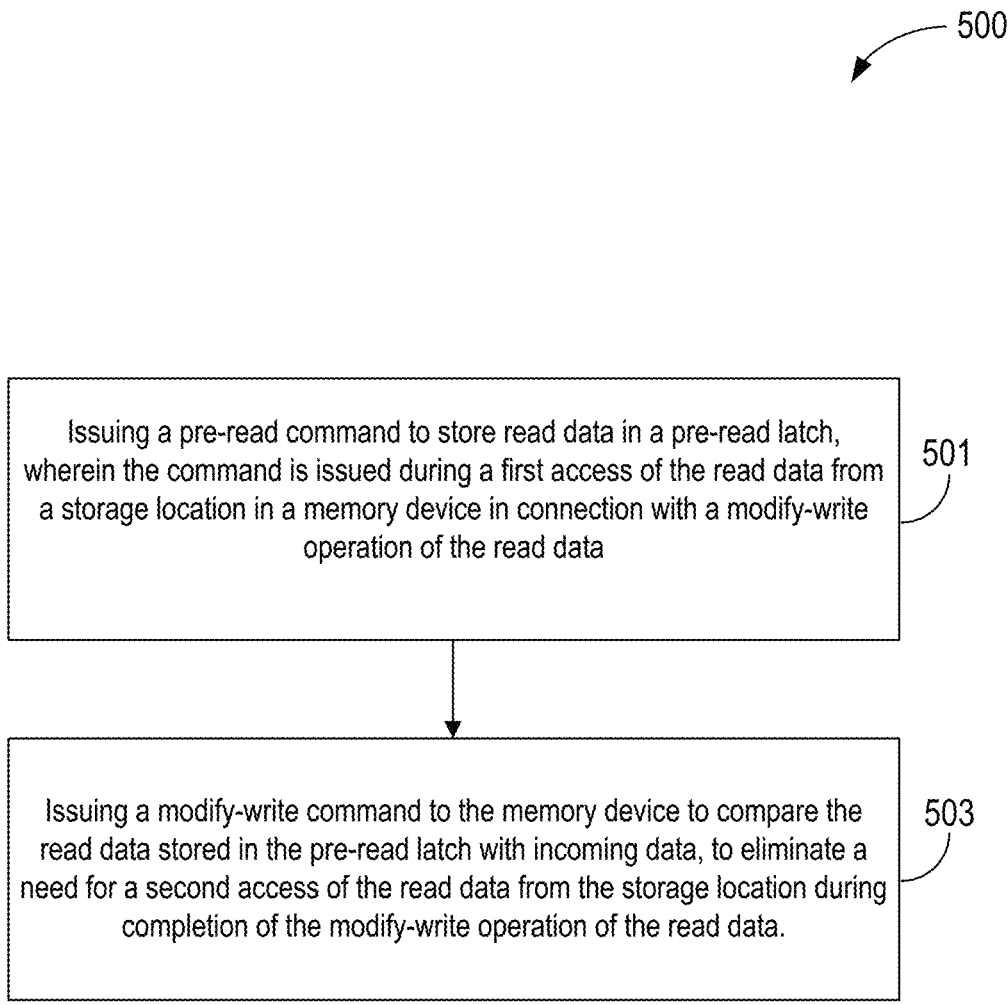
FIG. 5 is a flow diagram associated with embodiments of FIGS. 4A and 4B, in accordance with embodiments of the present disclosure.

Referring now to FIG. 5, which is a flow diagram describing process 500, associated with FIGS. 4A and 4B above. In embodiments, process 500 includes issuing a pre-read command and a subsequent modify-write command to simplify a modify-write operation with respect to a memory device, e.g., memory device 401, in accordance with embodiments. In embodiments, due to the new pre-read command, the subsequent modify-write command does not require an inside pre-read command. In some embodiments, process 500 is performed by a memory controller or constituent parts of a memory controller. Beginning at a block 501, process 500 includes issuing a pre-read command to store read data (e.g., pre-read latch 409 of FIGS. 4A and 4B) in a pre-read latch, wherein the command is issued during a first access of the read data from a storage location in a memory device in connection with a modify-write operation of the read data. In embodiments, the pre-read command is issued at a similar time as a read command is issued (to a read latch, e.g., of memory device 401), during the first access of the read data. Furthermore, in embodiments, issuing, by the memory controller, the pre-read command further comprises issuing a command to transport the read data to the memory controller for modification. Subsequently, in embodiments, the memory controller modifies the read data into the new write data. In embodiments, the new write data also includes error correction code (ECC) information.

Next, at a block 503, process 500 includes issuing a modify-write command to the memory device to compare the read data stored in the pre-read latch with the new write data or incoming data. In embodiments, the modify-write command eliminates a need for a second access of the read data from the storage location during completion of the modify-write operation of the read data. In embodiments, the second access of the read data includes access of the read data from the storage location to perform the comparison of the read data to the new write data. In embodiments, as discussed above in connection with FIG. 4B, the memory device subsequently writes into the storage location of a selected partition, e.g., partition 403, bits that have changed, to complete the modify-write operation.

Figure 6:
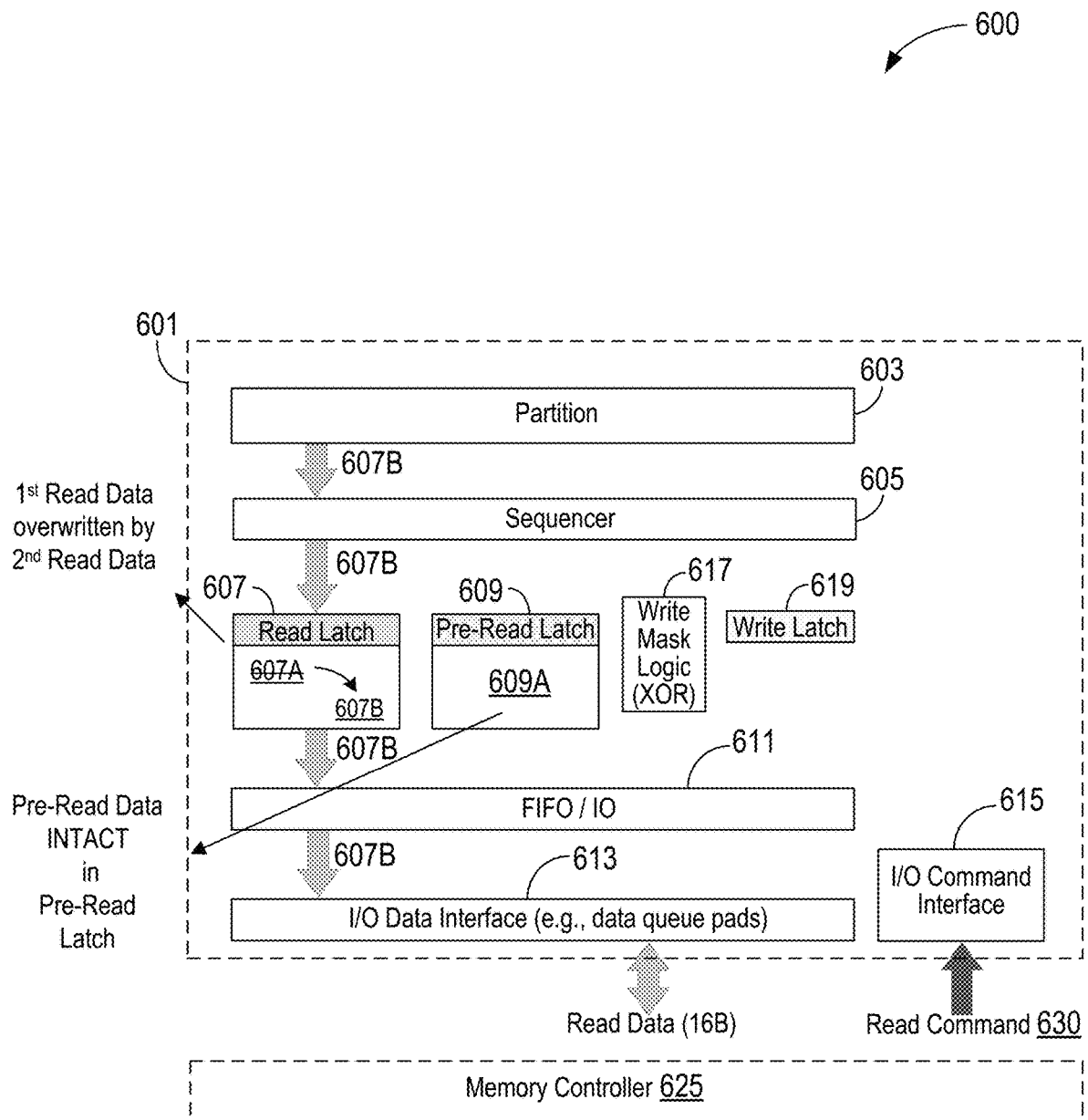
FIG. 6 is a block diagram illustrating a read operation performed in a memory device similar to the memory device of FIGS. 4A and 4B, in accordance with an additional embodiment of the present disclosure.

Note that in related embodiments to those illustrated in FIGS. 4A and 4B above, pre-read data (e.g., read data to be used in a pre-read operation) stored in pre-read latch 409 in response to pre-read command 418 remains intact during one or more read data requests (e.g., read data requests for additional or second read data, e.g., as issued by a memory controller 425). FIG. 6 is a block diagram illustrating a read operation performed in a memory device similar to the memory device of FIGS. 4A and 4B. In the embodiment of FIG. 6, a pre-read command may have already been issued and completed, e.g., similar to pre-read command 418 as illustrated in FIG. 4A, yet prior to the modify-write command 427 of FIG. 4B). Accordingly, in FIG. 6, pre-read data 609A is already stored in pre-read latch 609. In embodiments, during the interim, a read command 630 for other read data or second read data (e.g., read data different from or associated with current pre-read data 609A stored in pre-read latch 609) is received from a memory controller 625 at command interface 615. In embodiments, previous or first read data 607A stored in read latch 607 is overwritten by new or second read data 607B. In embodiments, new read data 607B is then provided via I/O buffer 611 and I/O data interface 613, to memory controller 625. Accordingly, in embodiments, pre-read data 609A stored in pre-read latch 609 remains intact. In embodiments, when memory controller 625 issues a modify-write command, e.g., similar to modify-write command 427 of FIG. 4B, completion of the modify-write operation associated with original or first read data of pre-read data 609A occurs. In embodiments, the completion of the modify-write operation occurs as shown and discussed with respect to FIG. 4B.

Figure 7:
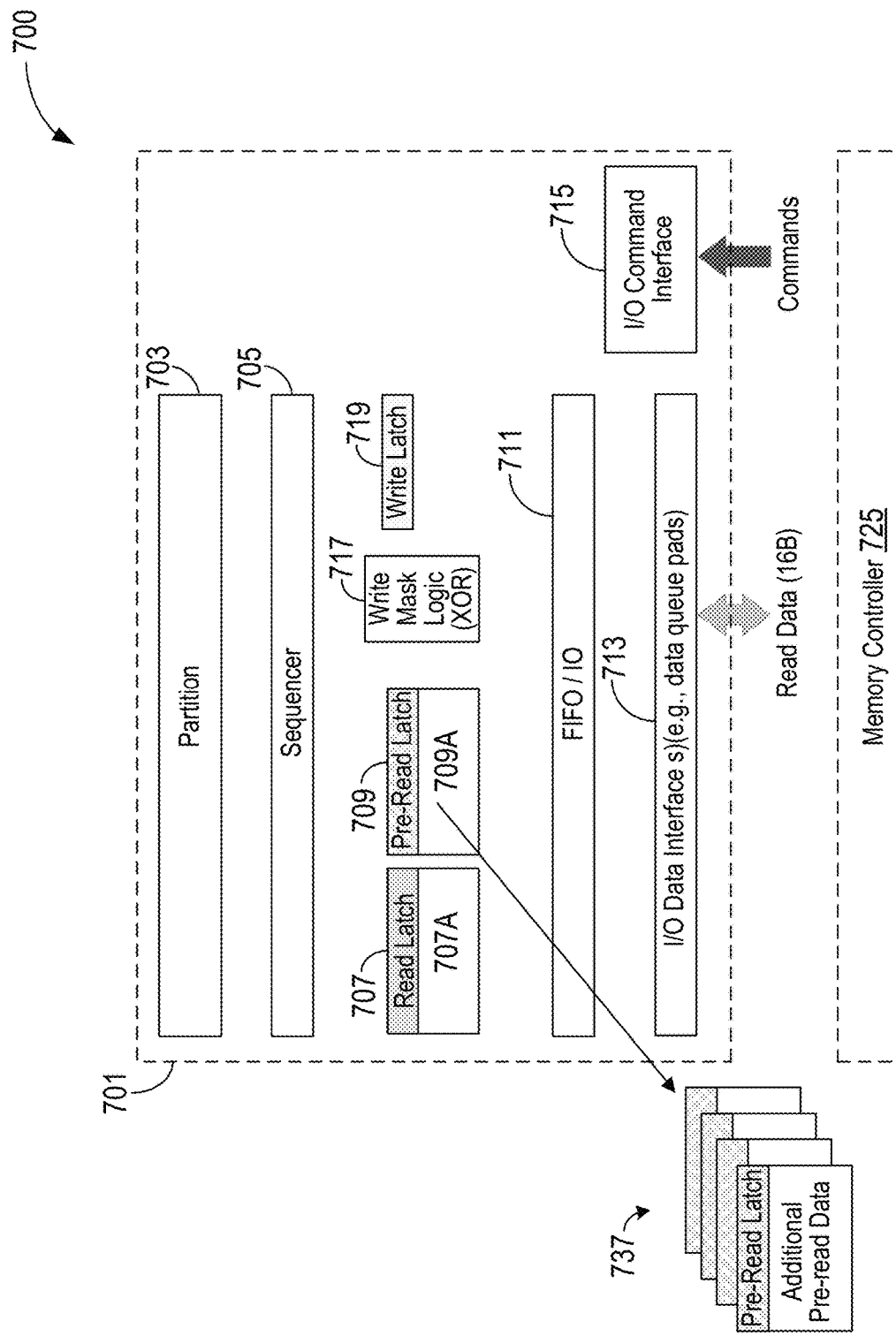
FIG. 7 is a block diagram illustrating another embodiment of a memory device in which modify-write operations are performed, in accordance with embodiments of the present disclosure.

Referring now to FIG. 7, which illustrates an additional embodiment to simplify modify-write operations performed in a memory device 701. In embodiments, memory device 701 is similar or the same as memory device 401 of FIG. 4A, with the exception of an additional plurality of pre-read latches 737 to pre-read latch 709. Accordingly, a partition 703 of a plurality of partitions provides a first access to read data in a storage location of the partition, wherein the first access is provided to store the read data to be sent for modification in connection with a modify-write operation of the read data. In embodiments, a first storage element and a second storage element are coupled to receive the read data from the storage location. In embodiments, the first storage element (e.g., read latch 707) is to temporarily store the read data for the modification, and the second storage element (e.g., pre-read latch 709) is coupled to or located in the selected partition to continue to store the read data after the read data is sent for modification to eliminate a second access of the read data from the storage location during completion of the modify-write operation. In the embodiment of FIG. 7, the second storage element is a pre-read latch and the memory device 701 includes an additional plurality of pre-read latches 737 in or coupled to the partition to store additional pre-read data associated with additional modify-write requests. Although only four pre-read latches are shown in FIG. 7, plurality of pre-read latches 737 includes more or fewer pre-read latches as suitable to simplify the modify-write operations. Note that in embodiments, the additional plurality of pre-read latches allows memory controller 705 more flexibility in providing additional storage elements for pre-read data 709A or read data 707A.

Figure 8:
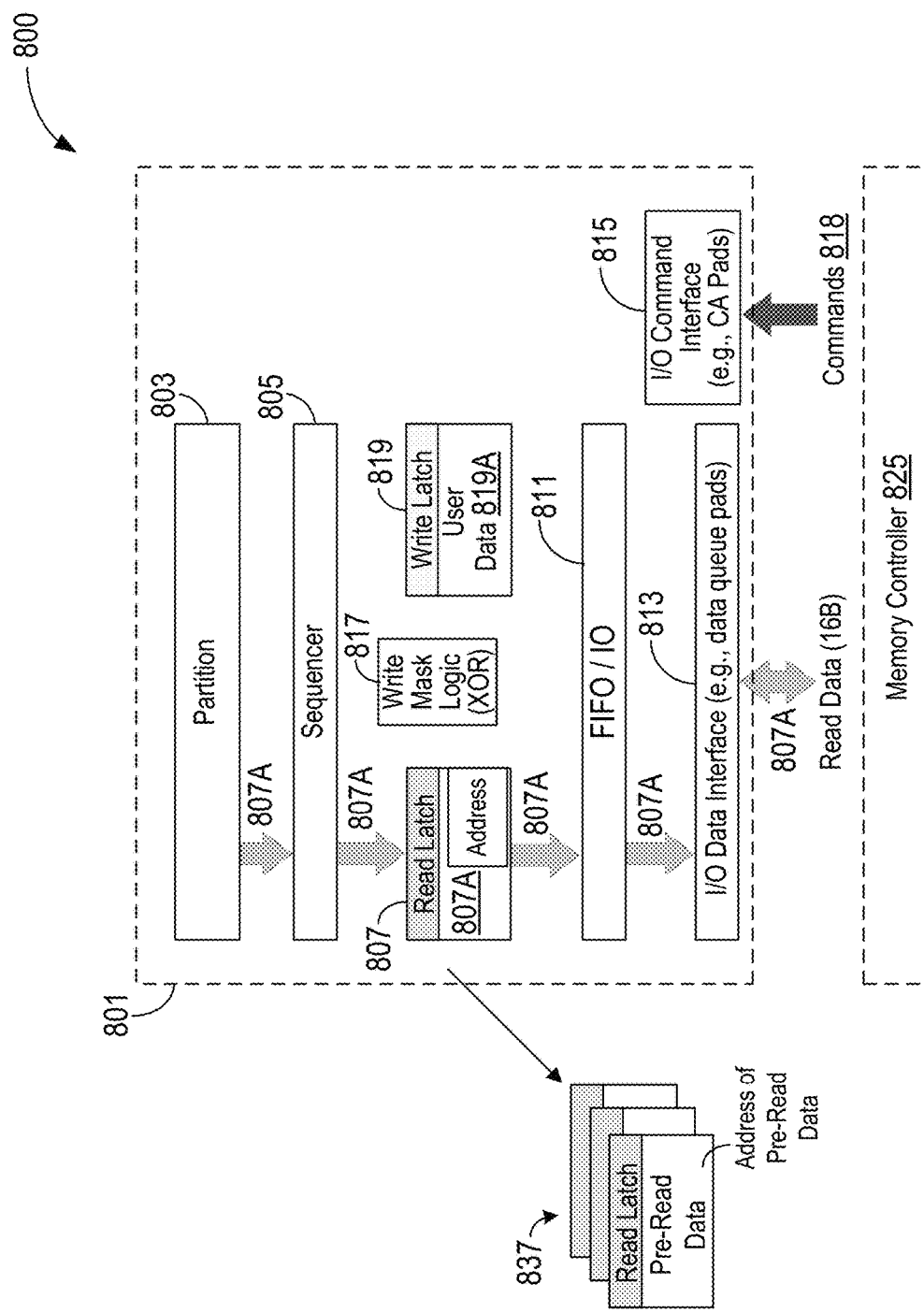
FIG. 8 is a block diagram illustrating another embodiment of a memory device in which modify-write operations are performed, in accordance with embodiments of the present disclosure.

Referring now to FIG. 8, which illustrates an additional embodiment to simplify modify-write operations performed in a memory device 801. In embodiments, similar in structure and function to like-numbered elements in FIGS. 3, 4, 6 and 7, memory device 801 includes a partition 803, sequencer 805, read latch 807, write mask logic 817, I/O buffer 811, data interface 813, and command interface 815. The embodiment shown in FIG. 8, however, does not include a pre-read latch but simply includes read latch 807 to store read data that may also be later utilized as pre-read data 807A. In embodiments, an address associated with an original storage location of the read data is also stored in read latch 807. In some embodiments, memory device 801 further includes a plurality of additional read latches, e.g., read latches 837, to hold additional corresponding pre-read data and corresponding addresses. Accordingly, a partition 803 of a plurality of partitions provides a first access to read data in a storage location of the partition, wherein the first access is provided to store the read data to be sent for modification in connection with a modify-write operation of the read data. In embodiments, a first storage element and a second storage element are coupled to receive the read data from the storage location. Accordingly, in embodiments, the first and the second storage element (e.g., read latch 807) are the same storage element and an address of the original storage location in partition 803 is stored in the storage element. In embodiments, memory device 801 further comprises compare logic to compare the address of the storage location to a new address associated with a new write request (e.g., received at commands 818). In embodiments, if the address of the storage location and the new address match, memory device 801 can simply access pre-read data 807A from read latch 807 during an actual modify-write operation using, e.g., write mask logic 817, and can skip performing a typical pre-read operation. In embodiments, if the addresses do not match, a pre-read operation is performed, where pre-read data is retrieved from the storage location for performance of the actual modify-write. Accordingly, in some embodiments, there may be no need for a new pre-read command or a pre-read latch.

Figure 9:
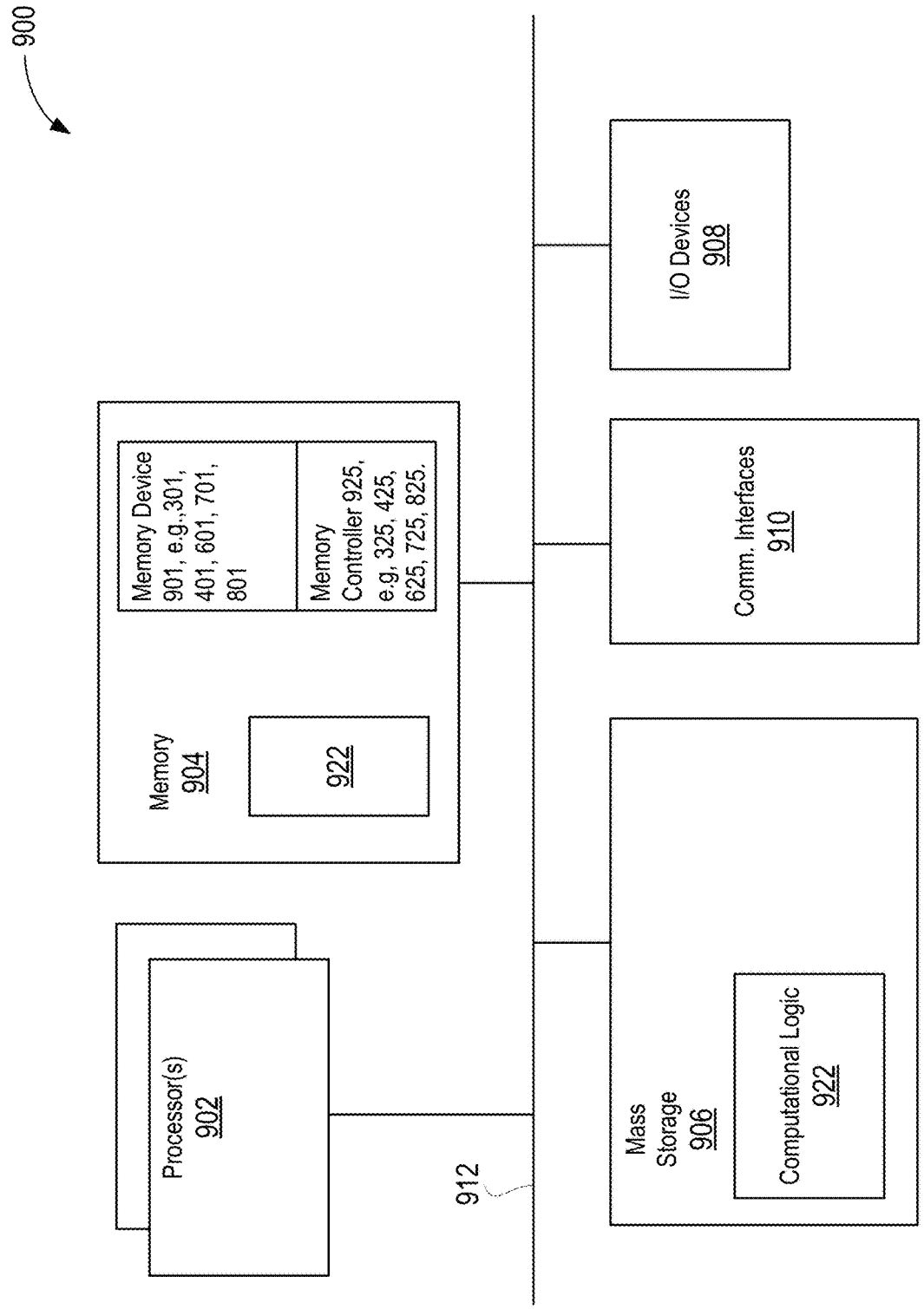
FIG. 9 a diagram of a computer system or device associated with embodiments of FIGS. 3-8 in accordance with embodiments of the present disclosure.

FIG. 9 illustrates an example electronic device 900 (e.g., a computer, a server, or some other electronic device) that may be suitable to practice selected aspects of the present disclosure. As shown, electronic device 900 may include one or more processors or processor cores 902. For the purpose of this application, including the claims, the term "processors" refers to physical processors, and the terms "processor" and "processor cores" may be considered synonymous, unless the context clearly requires otherwise. The electronic device 900 may include one or more memories 904, which may include one more memory devices 901, e.g., memory devices 301, 401, 601, 701, 801, etc. as described herein. In embodiments, one or more memory controller(s) 925 are operably coupled to the processor or processor cores 902 and the memory device 901. In embodiments, the memory controller includes, e.g., memory controller logic, to issue a pre-read command to the memory device to store read data in a pre-read latch, wherein the command is issued during a first access of the read data from a storage location in the memory device in connection with a modify-write operation of the read data; and issue a modify-write command to the memory device to compare the read data stored in the pre-read latch with incoming data, to eliminate a need for a second access of the read data from the storage location during completion of the modify-write operation of the read data. In embodiments, the memory devices 901 may include a memory unit or medium including a cross-point memory array. In embodiments, the memory units may include one or more phase-change memory devices.

In embodiments, a memory device 901 includes a non-volatile memory NVM device, e.g., a byte-addressable write-in-place three dimensional crosspoint memory device, or other byte addressable write-in-place NVM devices (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

Additionally, electronic device 900 may include mass storage devices 906 (such as diskette, hard drive, compact disc read-only memory (CD-ROM) and so forth), input/output (I/O) devices 908 (such as display, keyboard, cursor control and so forth) and communication interfaces 910 (such as network interface cards, modems and so forth). In some embodiments, mass storage devices may also include devices similar to memory devices 901 and memory controllers 925. The elements may be coupled to each other via system bus 912, which may represent one or more buses. In the case of multiple buses, they may be bridged by one or more bus bridges (not shown). Each of these elements may perform its conventional functions known in the art. In particular, in some embodiments, memory 904 and mass storage devices 906 may be employed to store a working copy and a permanent copy of the programming instructions configured to perform one or more processes or memory/storage transactions for the electronic device 900. The programming instructions may be collectively referred to as computational logic 922. The various elements may be implemented by assembler instructions supported by processor(s) 902 or high-level languages, such as, for example, C, that can be compiled into such instructions.

The number, capability and/or capacity of the elements shown in FIG. 9 may vary, depending on whether electronic device 900 is used as a server, communication device, or some other type of computing device. When used as a server device, the capability and/or capacity of the elements shown in FIG. 9 may also vary, depending on whether the server is a single stand-alone server or a configured rack of servers or a configured rack of server elements.

Otherwise, the constitutions of the elements shown in FIG. 9 may be known, and accordingly will not be further described.

According to various embodiments, the present disclosure describes a number of examples.

Example 1 is an apparatus, comprising a partition of a plurality of partitions included in a memory device to provide a first access to read data in a storage location of the partition, wherein the first access is provided to store the read data to be sent for modification in connection with a modify-write operation of the read data; and a first storage element and a second storage element coupled to receive the read data from the storage location, wherein the first storage element is to temporarily store the read data for the modification and the second storage element is coupled to or located in the selected partition to continue to store the read data after the read data is sent for modification to eliminate a second access of the read data from the storage location during completion of the modify-write operation.

Example 2 is the apparatus of Example 1, wherein the apparatus is a memory device and the first storage element comprises a read latch and the second storage element comprises a pre-read latch dedicated to storage of pre-read data.

Example 3 is the apparatus of Example 2, wherein the pre-read latch is to store the read data as pre-read data in response to a pre-read command received from a memory controller coupled to the memory device.

Example 4 is the apparatus of Example 1, wherein the first storage element comprises a first read latch and the read data comprises first read data and the second storage element comprises a second read latch to store second read data in connection with a read data request of second read data and wherein the first read data remains intact in the first read latch during completion of the read data request.

Example 5 is the apparatus of Example 1, wherein completion of the modify-write operation includes to compare the read data with new write data to store bits that have changed in the storage location of the memory device.

Example 6 is the apparatus of Example 5, wherein the second access of the read data includes access of the read data from the storage location to perform the comparison of the read data to the new write data.

Example 7 is the apparatus of any one of Examples 1-6, further comprising a memory controller to receive the read data sent for modification and to modify the read data into the modified read data including new write data, wherein the new write data is to include error correction code (ECC) information.

Example 8 is the apparatus of Example 1, wherein the first and the second storage elements are the same storage element and an address of the storage location is stored in the storage element and the apparatus further comprises logic to compare the address of the storage location to a new address associated with a new write request.

Example 9 is the apparatus of Example 8, wherein the storage element is a read latch and further comprising an additional plurality of read latches to store additional read data associated with an additional corresponding plurality of read requests.

Example 10 is the apparatus of Example 1, wherein the second storage element is a pre-read latch and the apparatus further comprises an additional plurality of pre-read latches in the partition to store additional pre-read data associated with additional modify-write requests.

Example 11 is a method, comprising: issuing, by a memory controller, a pre-read command to a memory device to store read data in a pre-read latch, wherein the command is issued during a first access of the read data from a storage location in the memory device in connection with a modify-write operation of the read data; and issuing, by the memory controller, a modify-write command to the memory device to compare the read data stored in the pre-read latch with incoming data, to eliminate a need for a second access of the read data from the storage location during completion of the modify-write operation of the read data.

Example 12 is the method of Example 11, wherein the pre-read latch is located in or coupled to a selected partition of a memory device that includes the storage location to store the read data.

Example 13 is the method of Example 12, wherein the issuing, by the memory controller, the pre-read command to the memory device includes issuing the pre-read command at a similar time as a read command is issued to a read latch of the memory device, during the first access of the read data.

Example 14 is the method of Example 11, wherein issuing, by the memory controller, the pre-read command further comprises issuing a command to transport the read data to the memory controller for modification.

Example 15 is the method of Example 14, further comprising receiving by the memory controller the read data and to modify the read data into new write data, wherein the new write data is to include error correction code (ECC) information.

Example 16 is the method of Example 11, wherein the second access of the read data includes access of the read data from the storage location to perform the comparison of the read data to new write data.

Example 17 is the method of any one of Examples 11-16, wherein to compare the read data stored in the pre-read latch with incoming data comprises to perform a mask operation including an exclusive (XOR) operation.

Example 18 is a system, comprising: a processor; a memory device; and a memory controller operably coupled to the processor and the memory device, wherein the memory controller is to issue a pre-read command to the memory device to store read data in a pre-read latch, wherein the command is issued during a first access of the read data from a storage location in the memory device in connection with a modify-write operation of the read data; and issue a modify-write command to the memory device to compare the read data stored in the pre-read latch with incoming data, to eliminate a need for a second access of the read data from the storage location during completion of the modify-write operation of the read data.

Example 19 is the system of Example 18, wherein the pre-read latch is located in or coupled to a selected partition of a memory device that includes the storage location to store the read data.

Example 20 is the system of any one of Examples 18 or 19, wherein the memory controller is to issue the pre-read command at a similar time as a read command is issued to a read latch of the memory device, during the first access of the read data.

Example 21 includes the means for performing the method of any one of Examples 11-17.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to specific implementations disclosed in the specification and the claims. Rather, the scope is to be determined entirely by the following claims, which are to be construed in accordance with established doctrines of claim interpretation.

What is claimed is:
1. An apparatus, comprising:
a partition of a plurality of partitions included in a memory device to provide a first access to read data in a storage location of the partition, wherein the first access is provided to store the read data to be sent for modification in connection with a modify-write operation of the read data; and a first storage element and a second storage element coupled to or located in the partition to receive the read data from the storage location, wherein the first storage element is to temporarily store the read data as first read data for the modification, and wherein the second storage element is to store, in response to a pre-read command received from a memory controller coupled to the memory device, the read data as second read data, and to continue to store the second read data after the first read data is sent for modification in response to a read command associated with the modify-write operation and wherein the read command associated with the modify-write operation is received from the memory controller, wherein, in response to a modify-write command associated with the modify-write operation and generated after the pre-read command by the memory controller, the second read data stored in the second storage element is compared with new write data, and bits of the second read data that have changed as a result of the comparison between the second read data and the new write data are sent to be stored in the storage location of the partition, wherein a second access of the read data from the storage location is not performed during the continuing storage of the second read data and during completion of the modify-write operation.

2. The apparatus of claim 1, wherein the apparatus is a memory device and the first storage element comprises a read latch and the second storage element comprises a pre-read latch dedicated to storage of the second read data.

3. The apparatus of claim 1, wherein the first storage element comprises a first read latch to store the first read data and the second storage element comprises a second read latch to store the second read data in connection with a read data request of the second read data.

4. The apparatus of claim 2, wherein the memory controller is to receive the first read data sent for modification and to modify the first read data into modified read data including the new write data, wherein the new write data is to include error correction code (ECC) information.

5. The apparatus of claim 1, wherein the first and the second storage elements are the same storage element and an address of the storage location is stored in the storage element and the apparatus further comprises logic to compare the address of the storage location to a new address associated with a new write request.

6. The apparatus of claim 5, wherein the first and second storage elements comprise a read latch, and further comprising an additional plurality of read latches to store additional read data associated with an additional corresponding plurality of read requests.

7. The apparatus of claim 1, wherein the second storage element is a pre-read latch and the apparatus further comprises an additional plurality of pre-read latches in the partition to store additional pre-read data associated with additional modify-write requests.

8. A method, comprising:

issuing, by a memory controller, a read command where a first access of read data from a storage location in a memory device is performed and includes to store the read data as first read data in a read latch in connection with a modify-write operation of the read data;

issuing, by the memory controller, a pre-read command to the memory device to store a copy of the read data as second read data in a pre-read latch, and to continue to store the second read data in the pre-read latch after the first read data is sent for modification in response to a read command associated with the modify-write operation; and issuing, by the memory controller, after the pre-read command, a modify-write command to the memory device to generate a comparison of the second read data stored in the pre-read latch with incoming data, and to further generate sending bits of the second read data that have changed as a result of the comparison between the second read data and the incoming data, to be stored in the storage location of a partition, wherein a second access of the read data from the storage location is not performed during the continuing storage of the second read data in the pre-read latch and during completion of the modify-write operation of the read data.

9. The method of claim 8, wherein the pre-read latch is located in or coupled to a selected partition of a memory device that includes the storage location to store the read data.

10. The method of claim 9, wherein the issuing, by the memory controller, the pre-read command to the memory device includes issuing the pre-read command at a similar time as the read command is issued to the read latch of the memory device, during the first access of the read data.

11. The method of claim 8, further comprising receiving by the memory controller the first read data and to modify the first read data into new write data, wherein the new write data is to include error correction code (ECC) information.

12. The method of claim 8, wherein to compare the second read data stored in the pre-read latch with incoming data comprises to perform a mask operation including an exclusive (XOR) operation.

13. A system, comprising:

a processor;

a memory device; and a memory controller operably coupled to the processor and the memory device, wherein the memory controller is to:

issue a read command to the memory device wherein a first access of read data from a storage location in the memory device is performed and includes to store the read data as first read data in a read latch in connection with a modify-write operation of the read data;

issue a pre-read command to the memory device to store the read data as second read data in a pre-read latch, and to continue to store the second read data after the first read data is sent for modification in response to the read command, wherein the command is issued during or before the first access of the read data from the storage location; and issue, after the pre-read command, a modify-write command to the memory device to compare the second read data stored in the pre-read latch with incoming data, and send bits of the second read data that have changed as a result of the comparison between the second read data and the incoming data, to be stored in the storage location, wherein a second access of the read data from the storage location is not performed during the continuing storage of the second read data in the pre-read latch and during completion of the modify-write operation.

14. The system of claim 13, wherein the pre-read latch is located in or coupled to a selected partition of the memory device that includes the storage location to store the read data.

* * * * *